(12) United States Patent
Hasegawa

(10) Patent No.: US 11,843,209 B2
(45) Date of Patent: Dec. 12, 2023

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventor: Yuya Hasegawa, Inukami-gun (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 147 days.

(21) Appl. No.: 17/330,413

(22) Filed: May 26, 2021

(65) Prior Publication Data
US 2021/0281033 A1 Sep. 9, 2021

Related U.S. Application Data

(63) Continuation of application No. PCT/JP2019/045104, filed on Nov. 18, 2019.

(30) Foreign Application Priority Data

Dec. 13, 2018 (JP) .................................. 2018-233783

(51) Int. Cl.
 *H01R 39/00* (2006.01)
 *H01R 35/04* (2006.01)
 (Continued)

(52) U.S. Cl.
 CPC ........... *H01R 35/04* (2013.01); *B60R 16/027* (2013.01); *H01R 13/72* (2013.01); *B62D 1/10* (2013.01)

(58) Field of Classification Search
 CPC ...... H01R 13/72; H01R 35/04; B60R 16/027; B62D 1/10
 (Continued)

(56) References Cited

U.S. PATENT DOCUMENTS 5,674,082 A * 10/1997 Okuhara ............. H01R 35/025
  439/15
7,104,821 B2 * 9/2006 Araki .................... B60R 16/027
  439/164
(Continued)

FOREIGN PATENT DOCUMENTS

CN 103223916 7/2013
CN 108886226 11/2018
(Continued)

OTHER PUBLICATIONS

International Search Report for corresponding International Application No. PCT/JP2019/045104, dated Dec. 17, 2019.
(Continued)

*Primary Examiner* — Abdullah A Riyami
*Assistant Examiner* — Vladimir Imas
(74) *Attorney, Agent, or Firm* — Mori & Ward, LLP

(57) ABSTRACT

A rotary connector device includes a stator and a rotation body. The stator includes a first stator main body and a second stator main body. The rotation body is provided rotatably about a rotational axis with respect to the stator. The stator and the rotation body define a cable housing space between the stator and the rotation body. The second stator main body includes a first wall and a second wall. The first wall extends along an axial direction parallel to the rotational axis. The second wall extends along the axial direction and is spaced apart from the first wall in a radial direction perpendicular to the rotational axis. The first wall is disposed between the cable housing space and the second wall in the radial direction. The first stator main body includes an intermediate wall extending along the axial direction and disposed between the first wall and the second wall in the radial direction.

21 Claims, 15 Drawing Sheets

(51) Int. Cl.
  *B60R 16/027* (2006.01)
  *H01R 13/72* (2006.01)
  *B62D 1/10* (2006.01)
(58) Field of Classification Search
  USPC .......................................................... 439/4
  See application file for complete search history.

(56) References Cited

U.S. PATENT DOCUMENTS

| | | | | |
|---|---|---|---|---|
| 7,223,104 B2* | 5/2007 | Suenaga | ............... | H01R 35/04 439/15 |
| 7,393,222 B2* | 7/2008 | Asakura | ............... | H01R 35/025 439/15 |
| 7,445,451 B2* | 11/2008 | Tanaka | ................. | B60R 16/027 439/15 |
| 7,758,363 B2* | 7/2010 | Tanaka | ................. | G01D 5/145 439/15 |
| 7,798,816 B2* | 9/2010 | Oishi | ...................... | B62D 1/16 439/15 |
| 8,382,500 B2* | 2/2013 | Adachi | ................. | H01R 35/04 439/164 |
| 8,506,413 B2* | 8/2013 | Suzuki | .............. | B62D 15/0215 464/106 |
| 8,529,272 B2* | 9/2013 | Kamiya | ................ | B60R 16/027 439/15 |
| 8,740,626 B2* | 6/2014 | Sakurai | ................. | H01R 35/04 439/15 |
| 8,758,024 B2* | 6/2014 | Adachi | .............. | B60R 16/0207 439/15 |
| 8,834,189 B2* | 9/2014 | Hirai | ..................... | B60R 16/027 439/164 |
| 8,851,901 B2* | 10/2014 | Hiroki | ................... | H02G 11/02 439/15 |
| 8,911,239 B2* | 12/2014 | Yamaguchi | .......... | B60R 16/027 439/15 |
| 8,986,018 B2* | 3/2015 | Sakurai | ................. | H01R 35/04 439/15 |
| 8,986,026 B2* | 3/2015 | Utsunomiya | .......... | H01R 35/04 439/164 |
| 9,011,162 B2* | 4/2015 | Sato | ....................... | B60R 16/037 439/15 |
| 9,124,022 B2* | 9/2015 | Adachi | ................. | B60R 16/027 |
| 9,337,600 B2* | 5/2016 | Utsunomiya | ......... | B60R 16/027 |
| 9,371,046 B2* | 6/2016 | Utsunomiya | ......... | B60R 16/027 |
| 10,199,786 B2* | 2/2019 | Yamashita | ............. | H01R 35/04 |
| 10,439,348 B2* | 10/2019 | Hirai | ...................... | H01R 13/52 |
| 10,647,275 B2* | 5/2020 | Ushiyama | .......... | H01R 13/5216 |
| 10,981,525 B2* | 4/2021 | Hiroki | ................... | B60R 16/027 |
| 2013/0014975 A1 | 1/2013 | Sakurai et al. | | |
| 2013/0196518 A1 | 8/2013 | Sakurai et al. | | |
| 2019/0089109 A1 | 3/2019 | Hirai et al. | | |

FOREIGN PATENT DOCUMENTS

| | | |
|---|---|---|
| JP | 3408922 B2 | 12/1997 |
| JP | 2004-222369 | 8/2004 |
| JP | 2013-20850 | 1/2013 |
| JP | 2013-157209 | 8/2013 |
| JP | WO2017/170752 | 10/2017 |

OTHER PUBLICATIONS

Written Opinion for corresponding International Application No. PCT/JP2019/045104, dated Jun. 24, 2021.
Chinese Office Action for corresponding CN Application No. 201980079448.8, dated Nov. 28, 2022 (w/ English machine translation).
Extended European Search Report for corresponding EP Application No. 19896917.2-1132, dated Jan. 4, 2022.
Japanese Office Action for corresponding JP Application No. 2020-559876, dated Apr. 4, 2023 (w/ English machine translation).
Chinese Office Action for corresponding CN Application No. 201980079448.8, dated Jul. 19, 2023 (w/ English machine translation).

* cited by examiner

ROTARY CONNECTOR DEVICE

CROSS-REFERENCE TO RELATED APPLICATIONS

The present application is a continuation application of International Application No. PCT/JP2019/045104, filed Nov. 18, 2019, which claims priority to Japanese Patent Application No. 2018-233783 filed Dec. 13, 2018. The contents of these applications are incorporated herein by reference in their entirety.

BACKGROUND

Technical Field

The technology disclosed in the present application relates to a rotary connector device.

BACKGROUND ART

A rotary connector device used for vehicles is known (e.g., see Japanese Unexamined Patent Application Publication No. JP 2004-222369).

SUMMARY

According to one aspect of the present application, a rotary connector device includes a stator and a rotation body. The stator includes a first stator main body and a second stator main body that is a separate member from the first stator main body and is coupled to the first stator main body. The rotation body is provided rotatably about a rotational axis with respect to the stator. The stator and the rotation body define a cable housing space between the stator and the rotation body. The cable housing space is provided to surround the rotational axis. The second stator main body includes a first wall and a second wall. The first wall extends along an axial direction parallel to the rotational axis. The second wall extends along the axial direction and is spaced apart from the first wall in a radial direction perpendicular to the rotational axis. The first wall is disposed between the cable housing space and the second wall in the radial direction. The first stator main body includes an intermediate wall extending along the axial direction and disposed between the first wall and the second wall in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Hereinafter, embodiments will be described with reference to the drawings. In the figures, the same reference signs denote corresponding or identical components.

First Embodiment

Figure 1:
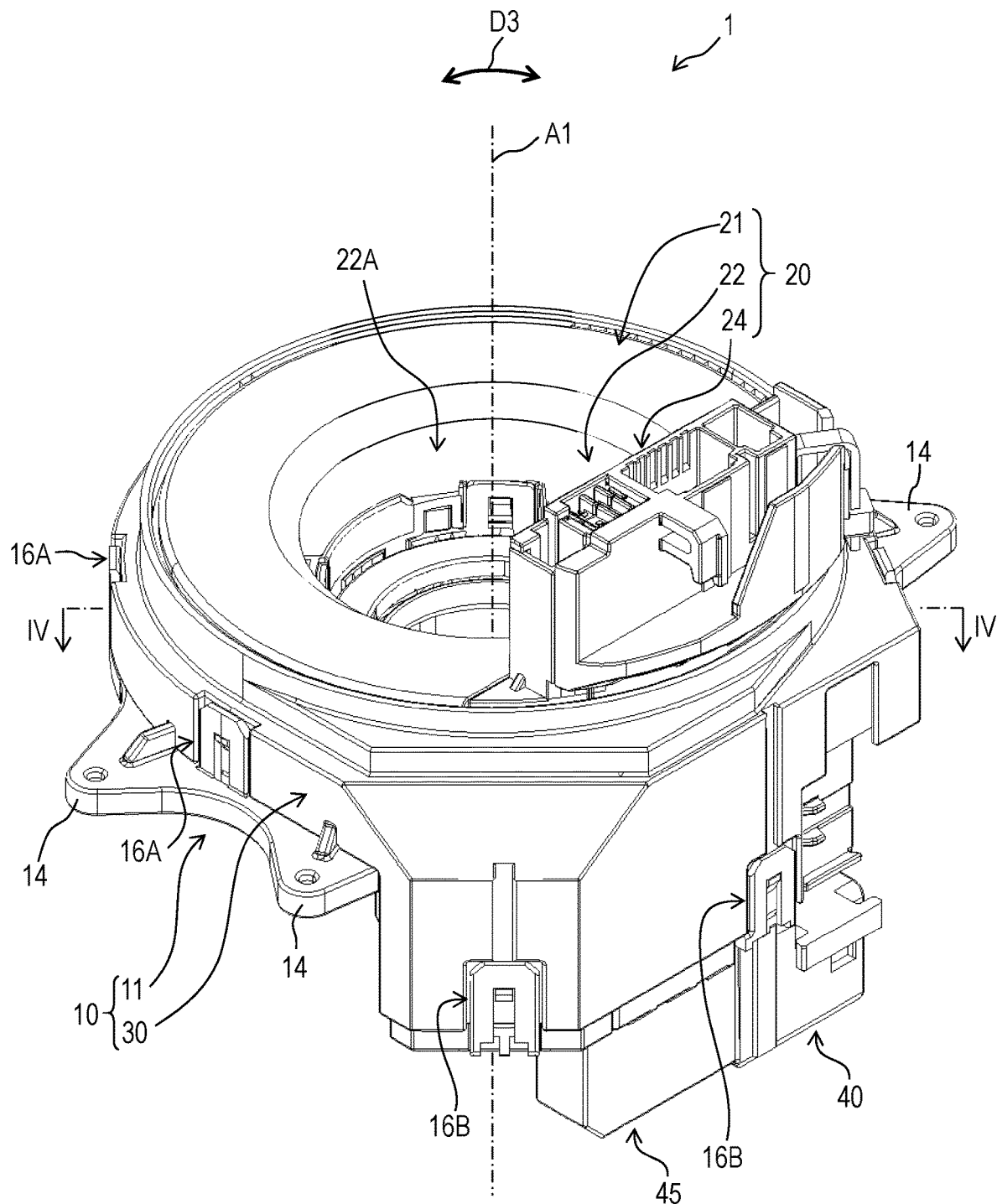
FIG. 1 is a perspective view of a rotary connector device according to a first embodiment.

FIG. 1 is a perspective view of a rotary connector device 1 according to a first embodiment. As illustrated in FIG. 1, the rotary connector device 1 includes the stator 10 and the rotation body 20. The rotation body 20 is provided rotatably about the rotational axis A1 with respect to the stator 10. In the present embodiment, for example, the stator 10 is configured to be fixed to the vehicle body, and the rotation body 20 is configured to be fixed to the steering wheel.

The stator 10 includes the first stator main body 11 and the second stator main body 30. The second stator main body 30 is a separate member from the first stator main body 11 and is coupled to the first stator main body 11. The first stator main body 11 is configured to be fixed to the vehicle body.

Figure 2:
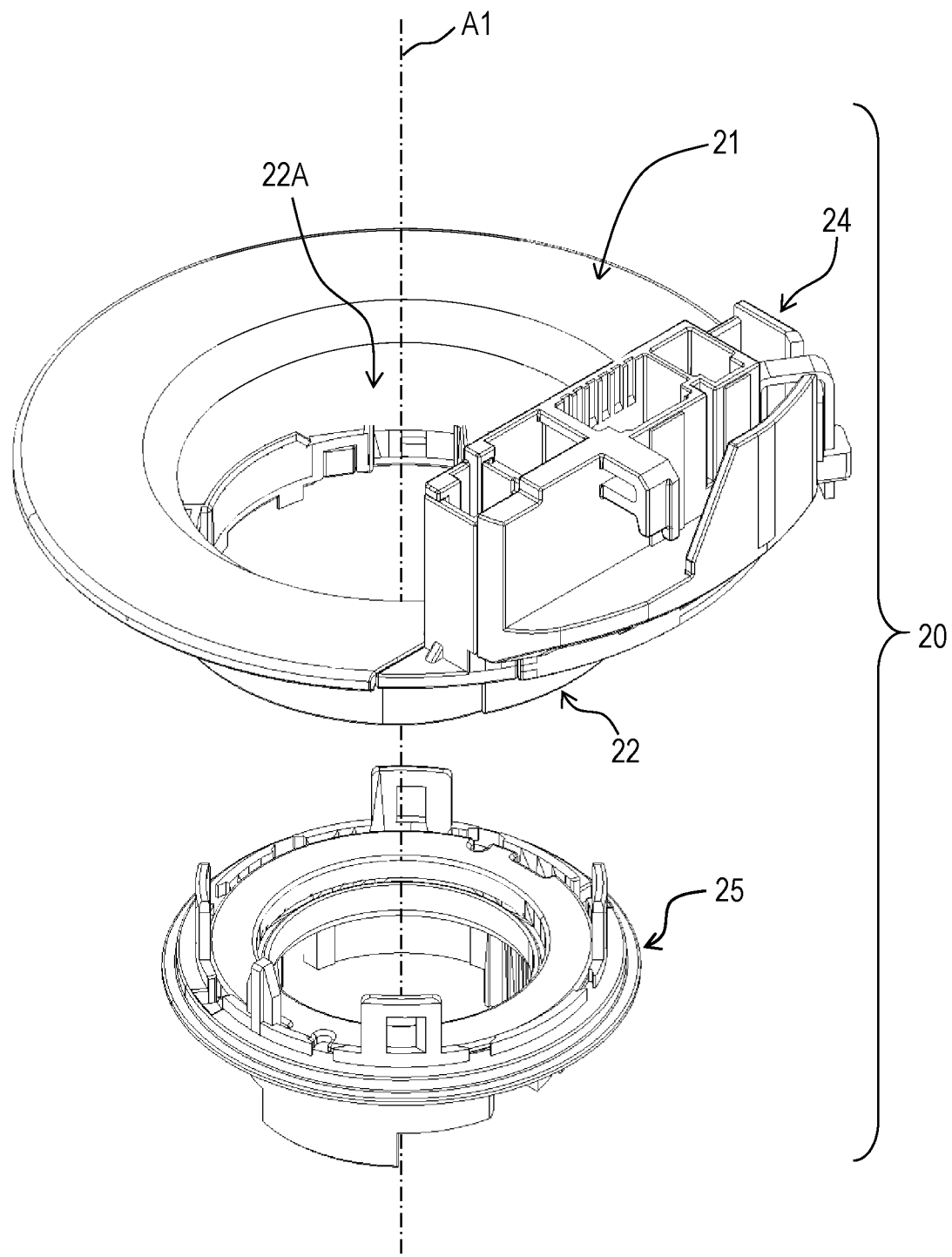
FIG. 2 is an exploded perspective view of a rotation body of the rotary connector device illustrated in FIG. 1.

FIG. 2 is an exploded perspective view of the rotation body 20 of the rotary connector device 1. As illustrated in FIG. 2, the rotation body 20 includes the rotation plate 21, the cylindrical portion 22, the connector housing section 24, and the sleeve 25. The rotation plate 21 has a substantially annular shape. The cylindrical portion 22 extends from the inner peripheral portion of the rotation plate 21 along the rotational axis A1 and includes the through-hole 22A through which the steering shaft passes. The through-hole 22A extends along the rotational axis A1. The sleeve 25 has an annular shape and is attached to the cylindrical portion 22.

The connector housing section 24 is provided on the rotation plate 21. For example, a plurality of electrical connectors connected to a plurality of electric devices (for example, a horn switch and an air bag unit) provided in a steering wheel is accommodated in the connector housing section 24.

Figure 3:
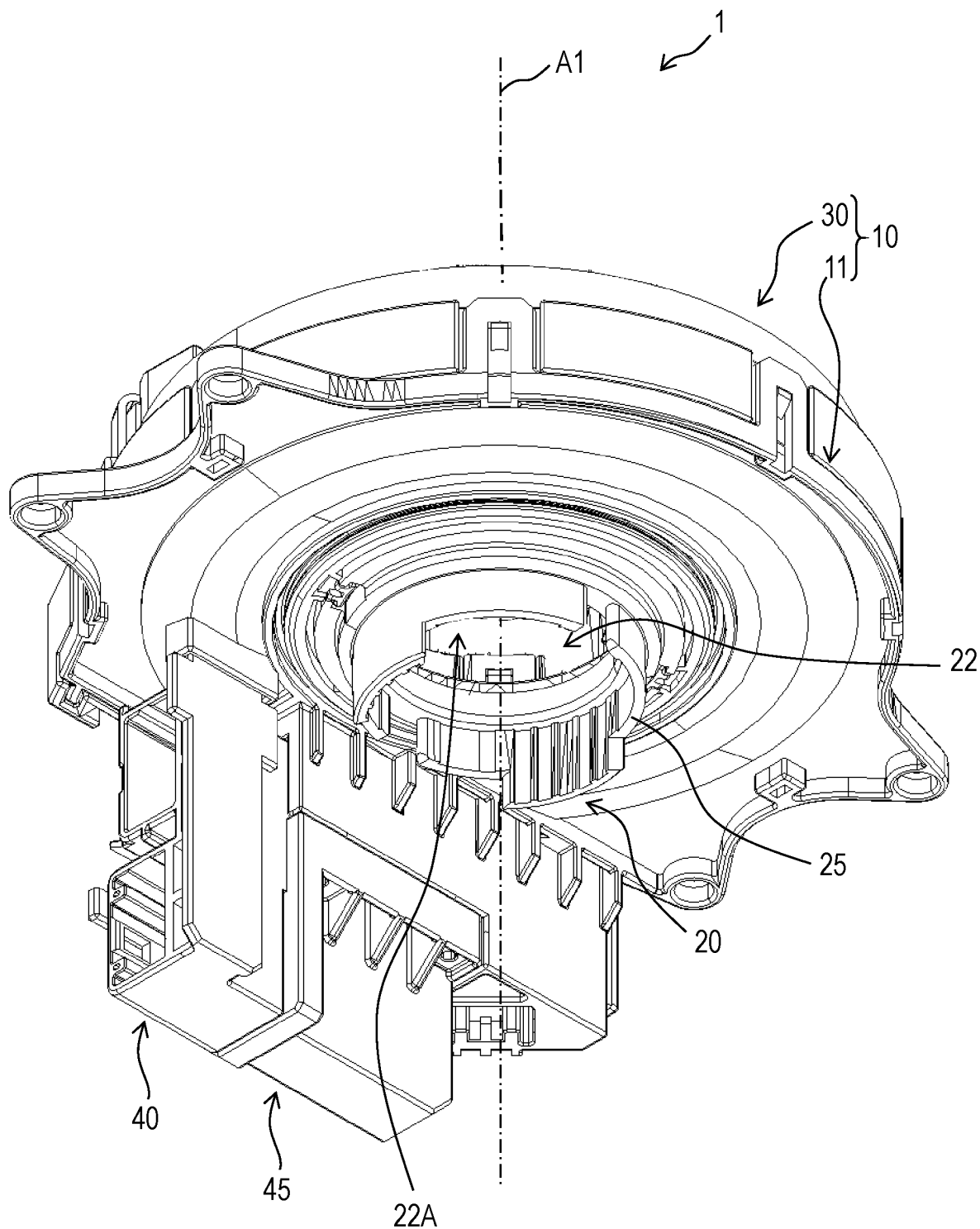
FIG. 3 is another perspective view of the rotary connector device illustrated in FIG. 1.

FIG. 3 is a perspective view of the rotary connector device 1. As illustrated in FIG. 3, the rotary connector device 1 includes the stator electrical connector 40 and the housing cover 45. The stator electrical connector 40 and the housing cover 45 are attached to the stator 10. The stator electrical connector 40 is connected to an electrical connector of an electrical device (for example, a control device and a battery) provided on the vehicle body.

Figure 4:
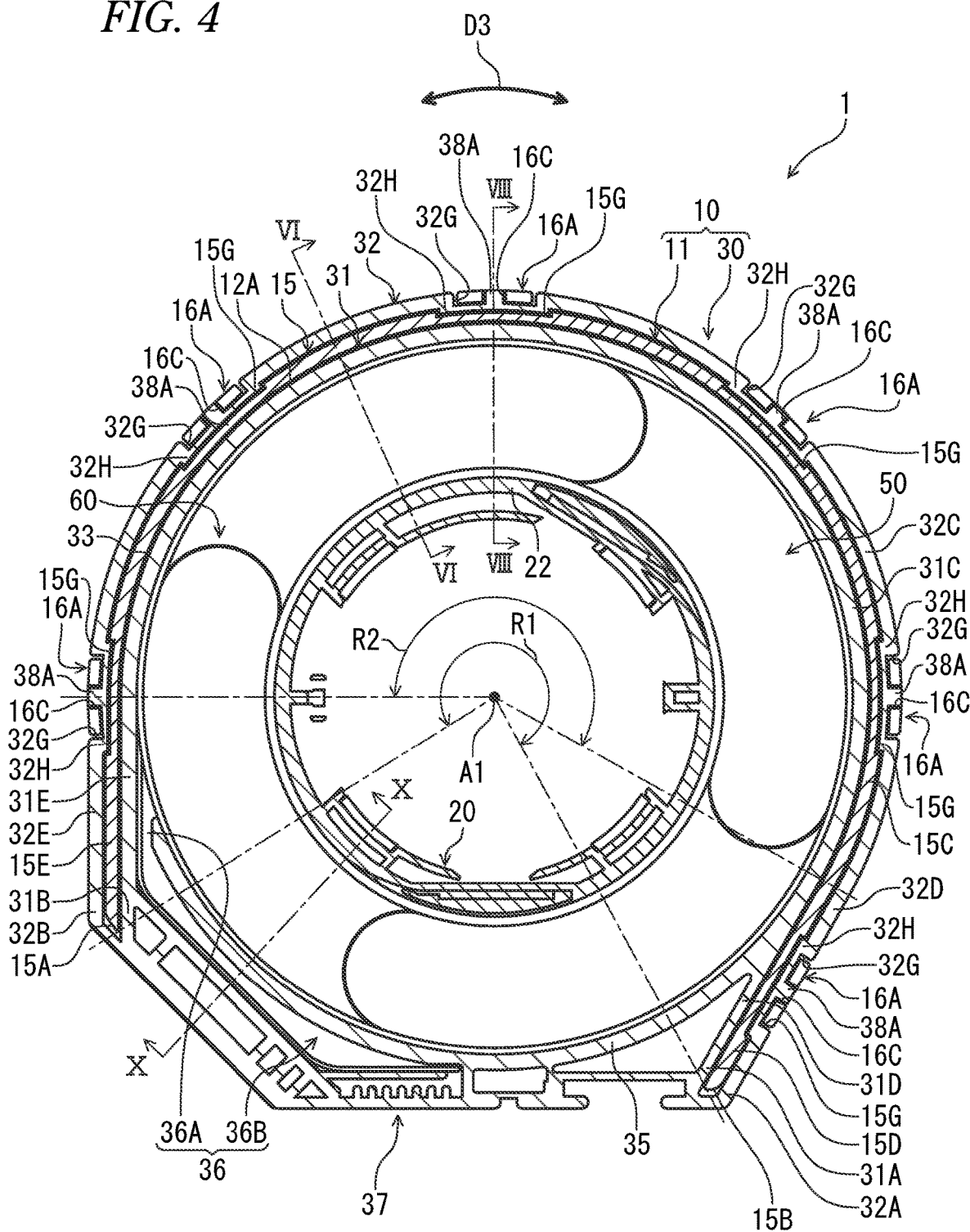
FIG. 4 is a cross-sectional view of the rotary connector device in line IV-IV in FIG. 1.

FIG. 4 is a cross-sectional view of the rotary connector device 1 in line IV-IV in FIG. 1. As illustrated in FIG. 4, the stator 10 and the rotation body 20 define the cable housing space 50 between the stator 10 and the rotation body 20, the cable housing space 50 being provided to surround the rotational axis A1. For example, the cable housing space 50 is annular. The rotary connector device 1 includes the electrical cable 60. The electrical cable 60 is disposed in the cable housing space 50 and is electrically connected to the stator electrical connector 40 (FIG. 1). The electrical cable 60 has flexibility and has a flat shape. The electrical cable 60 is also referred to as a flexible flat cable.

Figure 5:
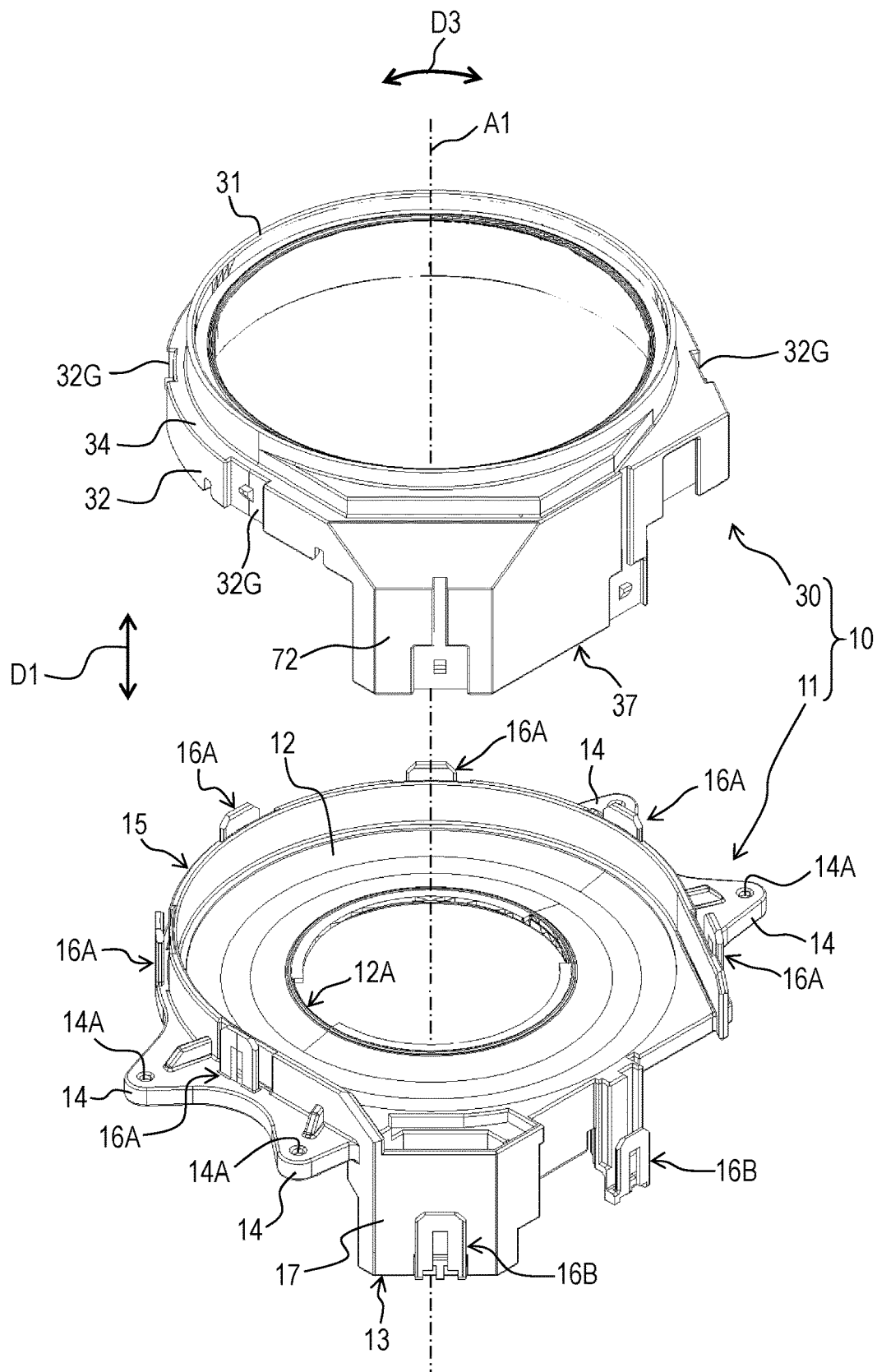
FIG. 5 is an exploded perspective view of a stator of the rotary connector device illustrated in FIG. 1.

FIG. 5 is an exploded perspective view of the stator 10 of the rotary connector device 1. As illustrated in FIG. 5, the first stator main body 11 includes the base plate 12. The base plate 12 includes an aperture 12A and has an annular shape. The first stator main body 11 includes the connector housing section 13 and the plurality of fixing portions 14. The connector housing section 13 extends from the base plate 12 along the axial direction D1 and accommodates, for example, an electrical connector for heat steering. The plurality of fixing portions 14 protrudes radially outwardly from the base plate 12. The fixing portion 14 is configured to be fixed to the vehicle body and includes the fixing hole 14A. The first stator main body 11 includes the intermediate wall 15. The intermediate wall 15 extends along the axial direction D1. Specifically, the intermediate wall 15 extends from the base plate 12 along the axial direction D1.

Figure 6:
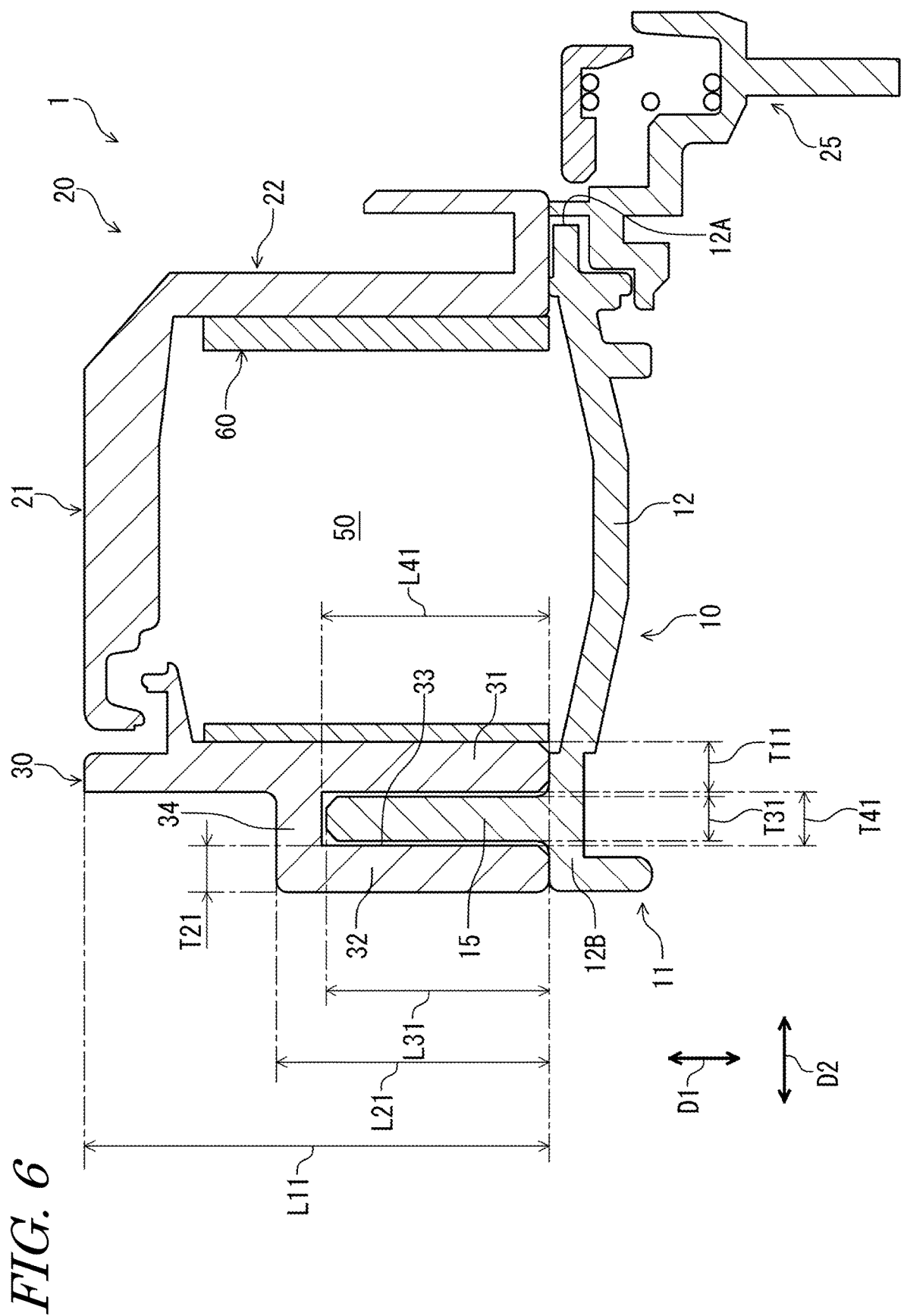
FIG. 6 is a cross-sectional view of the rotary connector device in line VI-VI in FIG. 4.

FIG. 6 is a cross-sectional view of the rotary connector device 1 in line VI-VI in FIG. 4. As illustrated in FIG. 6, the base plate 12 at least partially defines the cable housing space 50. The base plate 12 includes the outer peripheral portion 12B. The intermediate wall 15 extends from the outer peripheral portion 12B of the base plate 12 along the axial direction D1.

The second stator main body 30 includes the first wall 31 and the second wall 32. The first wall 31 extends along the axial direction D1 parallel to the rotational axis A1 and at least partially defines the cable housing space 50. The second wall 32 extends along the axial direction D1 and is spaced apart from the first wall 31 in the radial direction D2 perpendicular to the rotational axis A1. The first wall 31 is disposed between the cable housing space 50 and the second wall 32 in the radial direction D2. The first wall 31 and the second wall 32 are disposed on the outer side of the cable housing space 50 in the radial direction D2. The second wall 32 is disposed radially outwardly of the first wall 31. The intermediate wall 15 is disposed between the first wall 31 and the second wall 32 in the radial direction D2.

The second stator main body 30 includes the intermediate groove 33 provided between the first wall 31 and the second wall 32 in the radial direction D2. The intermediate wall 15 is disposed in the intermediate groove 33. The second stator main body 30 includes the coupling portion 34 that couples the first wall 31 to the second wall 32. The intermediate groove 33 is defined by the first wall 31, the second wall 32, and the coupling portion 34. At least one of the first wall 31 and the second wall 32 is contactable with the intermediate wall 15 in the radial direction D2. At least one of the first wall 31 and the second wall 32 is contactable with the base plate 12.

In the present embodiment, the first wall 31 and the second wall 32 are contactable with the intermediate wall 15 in the radial direction D2. The first wall 31 and the second wall 32 are in contact with the base plate 12. The positioning of the first stator main body 11 and the second stator main body 30 in the axial direction D1 is carried out by the first wall 31, the second wall 32, and the base plate 12. The intermediate wall 15 is separated from the coupling portion 34 in the axial direction D1. However, at least one of the first wall 31 and the second wall 32 may be in contact with the intermediate wall 15. At least one of the first wall 31 and the second wall 32 may be separated from the base plate 12 in the axial direction D1. A bonding structure such as an adhesive layer may also be provided between the first wall 31 and the intermediate wall 15, and between the second wall 32 and the intermediate wall 15.

The first wall 31 has the first maximum thickness T11 defined in the radial direction D2 and the first maximum length L11 defined in the axial direction D1. The first maximum length L11 is greater than the first maximum thickness T11. The second wall 32 has the second maximum thickness T21 defined in the radial direction D2 and the second maximum length L21 defined in the axial direction D1. The second maximum length L21 is greater than the second maximum thickness T21. The intermediate wall 15 has the third maximum thickness T31 defined in the radial direction D2 and the third maximum length L31 defined in the axial direction D1. The third maximum length L31 is greater than the third maximum thickness T31. However, the first maximum length L11 may be equal to or less than the first maximum thickness T11. The second maximum length L21 may be equal to or less than the second maximum thickness T21. The third maximum length L31 may be equal to or less than the third maximum thickness T31.

At least one of the first maximum length L11 and the second maximum length L21 is longer than the third maximum length L31 The third maximum length L31 is longer than at least one of the first maximum thickness T11 and the second maximum thickness T21. In the present embodiment, the first maximum length L11 and the second maximum length L21 are longer than the third maximum length L31 The third maximum length L31 is longer than the first maximum thickness T11 and the second maximum thickness T21. However, these dimensional relationships are not limited to the dimensional relationships disclosed in FIG. 6.

The intermediate groove 33 has the fourth maximum length L41 defined in the axial direction D1. The fourth maximum length L41 is equal to or longer than the third maximum length L31. In the present embodiment, the fourth maximum length L41 is longer than the third maximum length L31. However, the fourth maximum length L41 may be equal to the third maximum length L31.

The intermediate groove 33 has the groove width T41 defined in the radial direction D2. The groove width T41 is equal to or greater than the third maximum thickness T31 of the intermediate wall 15. In the present embodiment, the groove width T41 is greater than the third maximum thickness T31 of the intermediate wall 15. However, the groove width T41 may be equal to the third maximum thickness T31 of the intermediate wall 15.

In the present embodiment, the intermediate wall 15 is integrally provided with the base plate 12 as one single member. However, intermediate wall 15 may be a separate member from the base plate 12. The first wall 31, the second wall 32, and the coupling portion 34 are integrally provided with each other as one single member. However, at least one of the first wall 31, the second wall 32, and the coupling portion 34 may be a separate member from the other portion.

As illustrated in FIG. 4, at least one of the first wall 31, the second wall 32, and the intermediate wall 15 extends along the circumferential direction D3 defined about the rotational axis A1. At least one of the first wall 31, the second wall 32, and the intermediate wall 15 extends over 90 degrees or greater in the circumferential direction D3. At least one of the first wall 31, the second wall 32, and the intermediate wall 15 extends over 180 degrees or greater in the circumferential direction D3. In the present embodiment, the first wall 31, the second wall 32, and the intermediate wall 15 extend over 90 degrees or greater in the circumferential direction D3. The first wall 31, the second wall 32, and the intermediate wall 15 extend over 180 degrees or greater in the circumferential direction D3. However, at least one of the first wall 31, the second wall 32, and the intermediate wall 15 may extend within the range less than 180 degrees in the circumferential direction D3. At least one of the first wall 31, the second wall 32, and the intermediate wall 15 extends may extend within the range less than 90 degrees in the circumferential direction D3. In addition, each of the first wall 31, the second wall 32, and the intermediate wall 15 extends continuously along the circumferential direction D3, but at least one of the first wall 31, the second wall 32, and the intermediate wall 15 may be provided intermittently in the circumferential direction D3.

The intermediate wall 15 includes the first end portion 15A and the second end portion 15B. The intermediate wall 15 extends about the rotational axis A1 from the first end portion 15A to the second end portion 15B. The first end portion 15A and the second end portion 15B define the circumferential region R1 centered on the rotational axis A1. The circumferential region R1 has a center angle of 90 degrees or greater. The circumferential region R1 has a center angle of 180 degrees or greater. However, the center angle of the circumferential region R1 is not limited to the present embodiment.

In the embodiment, the intermediate wall 15 includes the curved portion 15C, the first flat plate portion 15D, and the second flat plate portion 15E. The curved portion 15C extends over 180 degrees or greater in the circumferential direction D3. The first flat plate portion 15D extends linearly from the end portion of the curved portion 15C and includes the first end portion 15A. The second flat plate portion 15E extends linearly from the end portion of the curved portion 15C and includes the second end portion 15B. When viewed from a direction along the rotational axis A1, the intermediate groove 33 has a shape complementary to the intermediate wall 15.

The curved portion 15C defines the circumferential region R2 centered on the rotational axis A1. The curved portion 15C extends in an arc shape about the rotational axis A1 in the circumferential region R2. The circumferential region R2 has a center angle of 90 degrees or greater. The circumferential region R2 has a center angle of 180 degrees or greater. However, the center angle of the circumferential region R2 is not limited to the present embodiment.

The first wall 31 includes the first end portion 31A and the second end portion 31B. The first wall 31 extends about the rotational axis A1 from the first end portion 31A to the second end portion 31B. In the embodiment, the first wall 31 includes the curved portion 31C, the first flat plate portion 31D, and the second flat plate portion 31E. The curved portion 31C extends over 180 degrees or greater in the circumferential direction D3. The first flat plate portion 31D extends linearly from the end portion of the curved portion 31C and includes the first end portion 31A. The second flat plate portion 31E extends linearly from the end portion of the curved portion 31C and includes the second end portion 31B. Similar to the curved portion 15C of the intermediate wall 15, the curved portion 31C extends in an arc shape about the rotational axis A1 in the circumferential region R2.

The second wall 32 includes the first end portion 32A and the second end portion 32B. The second wall 32 extends about the rotational axis A1 from the first end portion 32A to the second end portion 32B. In the present embodiment, the second wall 32 includes the curved portion 32C, the first flat plate portion 32D, and the second flat plate portion 32E. The curved portion 32C extends over 180 degrees or greater in the circumferential direction D3. The first flat plate portion 32D extends linearly from the end portion of the curved portion 32C and includes the first end portion 32A. The second flat plate portion 32E extends linearly from the end portion of the curved portion 32C and includes the second end portion 32B. Similar to the curved portion 15C of the intermediate wall 15, the curved portion 32C extends in an arc shape about the rotational axis A1 in the circumferential region R2.

The second stator main body 30 includes the third wall 35. The third wall 35 extends from the first wall 31 along the circumferential direction D3. More specifically, the third wall 35 extends from the first flat plate portion 31D toward the second flat plate portion 31E along the circumferential direction D3. The third wall 35 is spaced apart from the second flat plate portion 31E. The third wall 35 partially defines the cable housing space 50.

The second stator main body 30 includes the cable passage 36. The cable passage 36 is connected to the cable housing space 50. The electrical cable 60 is drawn from the cable housing space 50 to the outer side of the cable housing space 50 through the cable passage 36. The cable passage 36 includes the first passage 36A and the second passage 36B. The first passage 36A extends from the cable housing space 50 along the second flat plate portion 31E of the first wall 31. The second passage 36B extends from the first passage 36A along the outer periphery of the cable housing space 50 toward the first flat plate portion 31D of the first wall 31. The cable passage 36 is disposed between the first flat plate portion 15D and the second flat plate portion 15E of the intermediate wall 15.

The up-down direction in FIG. 4 substantially coincides with the up-down direction of the stator 10 when the stator 10 is mounted on the vehicle body. At least a portion of the intermediate wall 15 is disposed above the rotational axis A1 when the stator 10 is mounted on the vehicle body. In the present embodiment, a portion of the intermediate wall 15 is disposed on the uppermost portion of the stator 10 when the stator 10 is mounted on the vehicle body. The intermediate wall 15 is disposed over the entire area above the rotational axis A1 when the stator 10 is mounted on the vehicle body.

As illustrated in FIG. 5, the second stator main body 30 includes the cover portion 37. The cover portion 37 partially covers the connector housing section 13 in a state where the second stator main body 30 is coupled to the first stator main body 11. As illustrated in FIG. 4, the cover portion 37 extends from the first end portion 31A of the first wall 31 and the first end portion 32A of the second wall 32 to the second end portion 31B of the first wall 31 and the second end portion 32B of the second wall 32 along the circumferential direction D3. The cover portion 37 couples the first end portion 31A of the first wall 31 and the first end portion 32A of the second wall 32 to the second end portion 31B of the first wall 31 and the second end portion 32B of the second wall 32. The cover portion 37 is connected to the third wall 35. The cable passage 36 is defined between the first wall 31 and the third wall 35 and the cover portion 37.

As illustrated in FIG. 5, the first stator main body 11 includes the coupling body 16A. The coupling body 16A extends from the base plate 12 along the axial direction D1. The coupling body 16A couples the second stator main body 30 to the first stator main body 11. In the present embodiment, the first stator main body 11 includes a plurality of the coupling bodies 16A. Each of the plurality of coupling bodies 16A is disposed at intervals each other in the circumferential direction D3. Each of the plurality of coupling bodies 16A is disposed at substantially the same position in the axial direction D1. Each of the plurality of coupling bodies 16A is disposed radially outwardly of the intermediate wall 15. However, the total number and arrangement of the plurality of coupling bodies 16A are not limited to the present embodiment. At least one of the plurality of coupling bodies 16A may be omitted from the first stator main body 11.

The first stator main body 11 includes the additional coupling body 16B. The additional coupling body 16B is disposed at a position offset from the coupling body 16A in the axial direction D1. The additional coupling body 16B is disposed between the first end portion 15A and the second end portion 15B of the intermediate wall 15 and offset from the first end portion 15A and the second end portion 15B in the axial direction D1. In the present embodiment, the first stator main body 11 includes a plurality of the additional coupling bodies 16B. However, the total number of the plurality of additional coupling bodies 16B is not limited to the present embodiment. At least one of the plurality of additional coupling bodies 16B may be omitted from the first stator main body 11.

Figure 7:
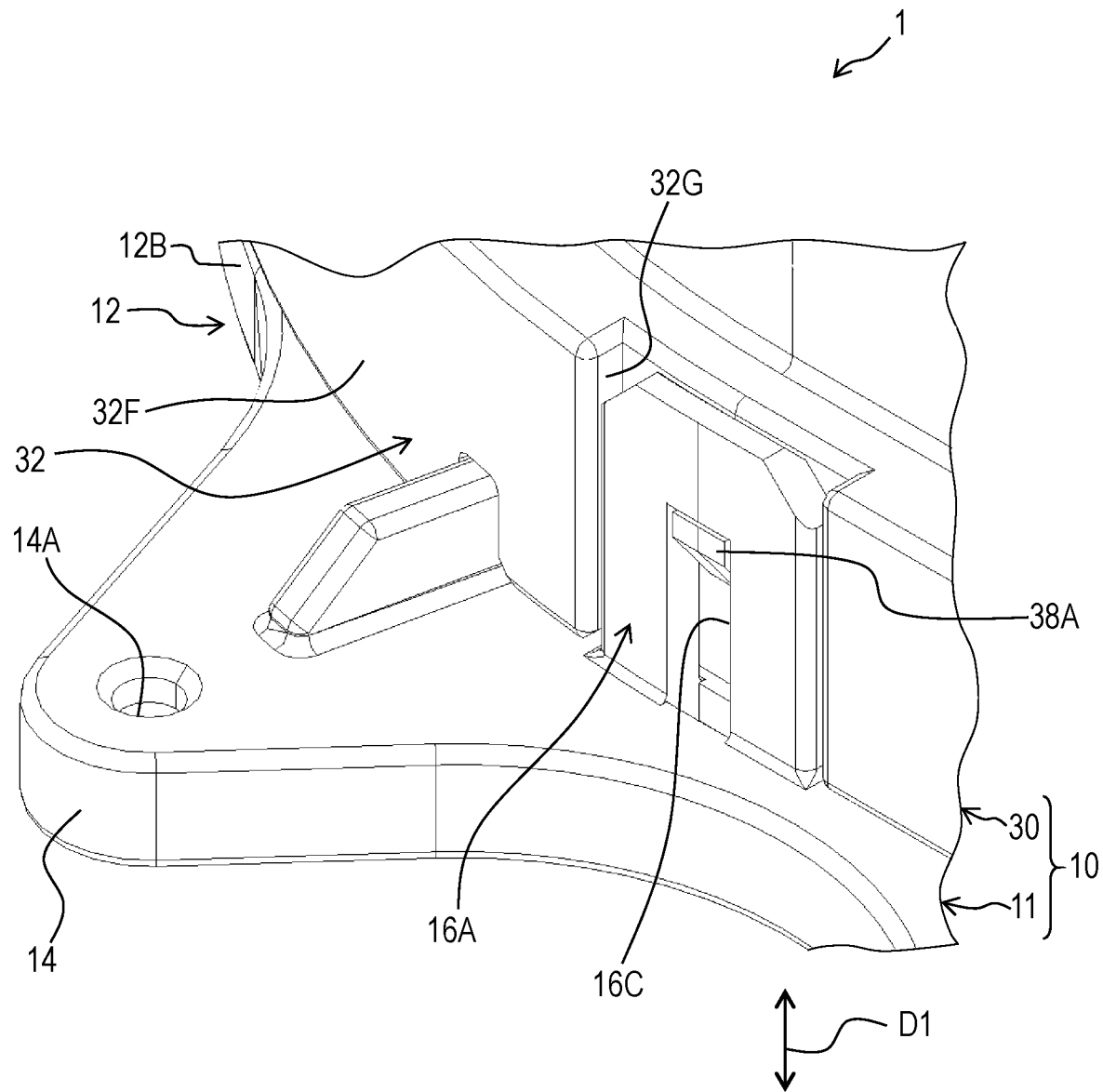
FIG. 7 is a partial perspective view of the rotary connector device illustrated in FIG. 1.

FIG. 7 is a partial perspective view of the rotary connector device 1. As illustrated in FIG. 7, the coupling body 16A includes the coupling groove 16C. The coupling groove 16C extends along the axial direction D1. However, the shape of the coupling body 16A is not limited to the present embodiment.

Figure 8:
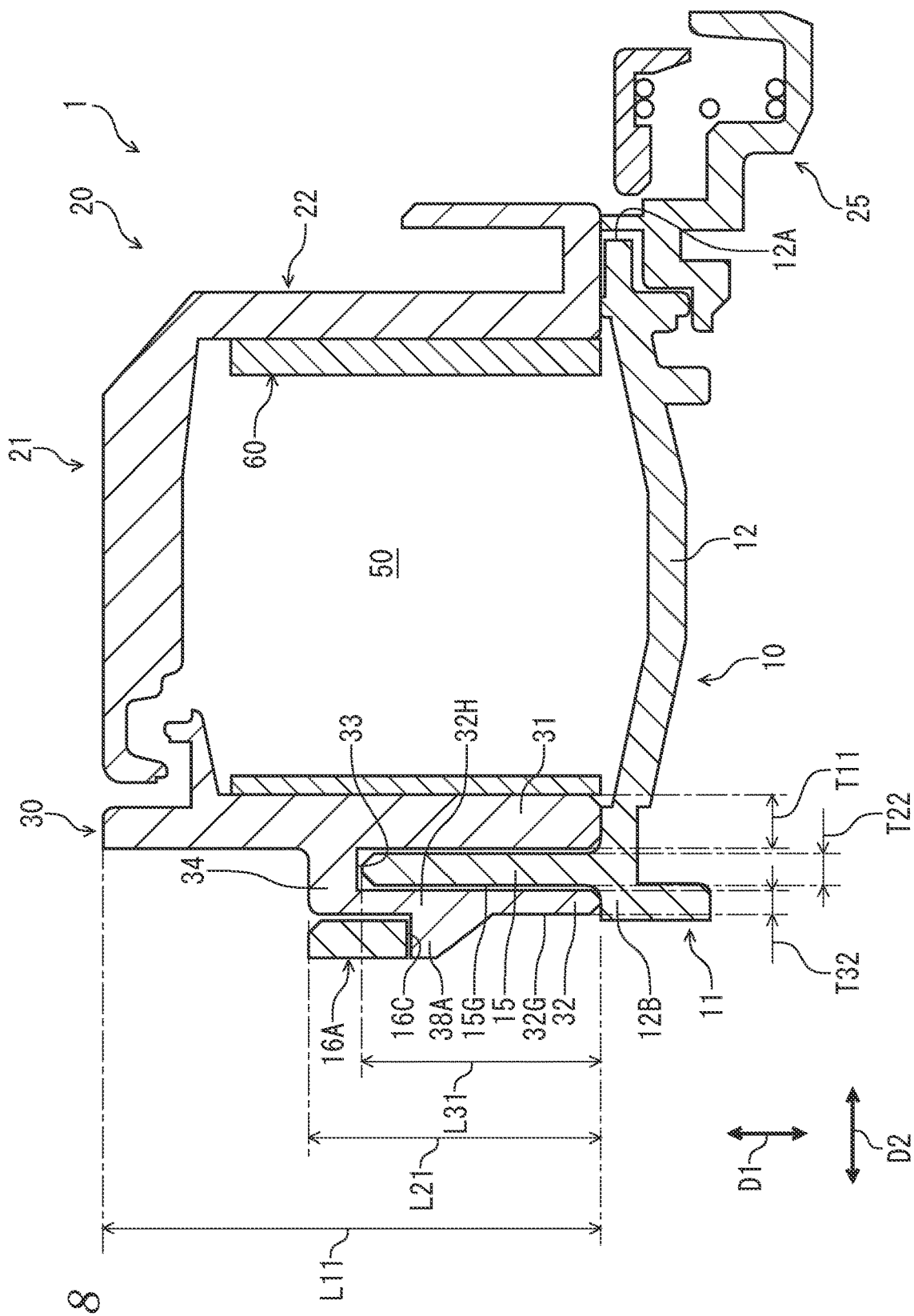
FIG. 8 is a cross-sectional view of the rotary connector device in line VIII-VIII in FIG. 4.

FIG. 8 is a cross-sectional view of the rotary connector device 1 in line VIII-VIII in FIG. 4. As illustrated in FIG. 8, the coupling body 16A is disposed separated from the intermediate wall 15 in the radial direction D2. The second wall 32 is disposed between the intermediate wall 15 and the coupling body 16A in the radial direction D2. The second stator main body 30 includes the protrusion 38A. The protrusion 38A protrudes radially outwardly from the second wall 32. The coupling body 16A is contactable with the protrusion 38A so as to couple the second stator main body 30 to the first stator main body 11. In the present embodiment, the protrusion 38A is disposed in the coupling groove 16C in a state where the second stator main body 30 is coupled to the first stator main body 11.

As illustrated in FIG. 4, in the present embodiment, the second stator main body 30 includes a plurality of the protrusions 38A. The total number of the plurality of protrusions 38A is equal to the total number of the plurality of coupling bodies 16A. However, the total number of the plurality of protrusions 38A is not limited to the present embodiment.

Figure 9:
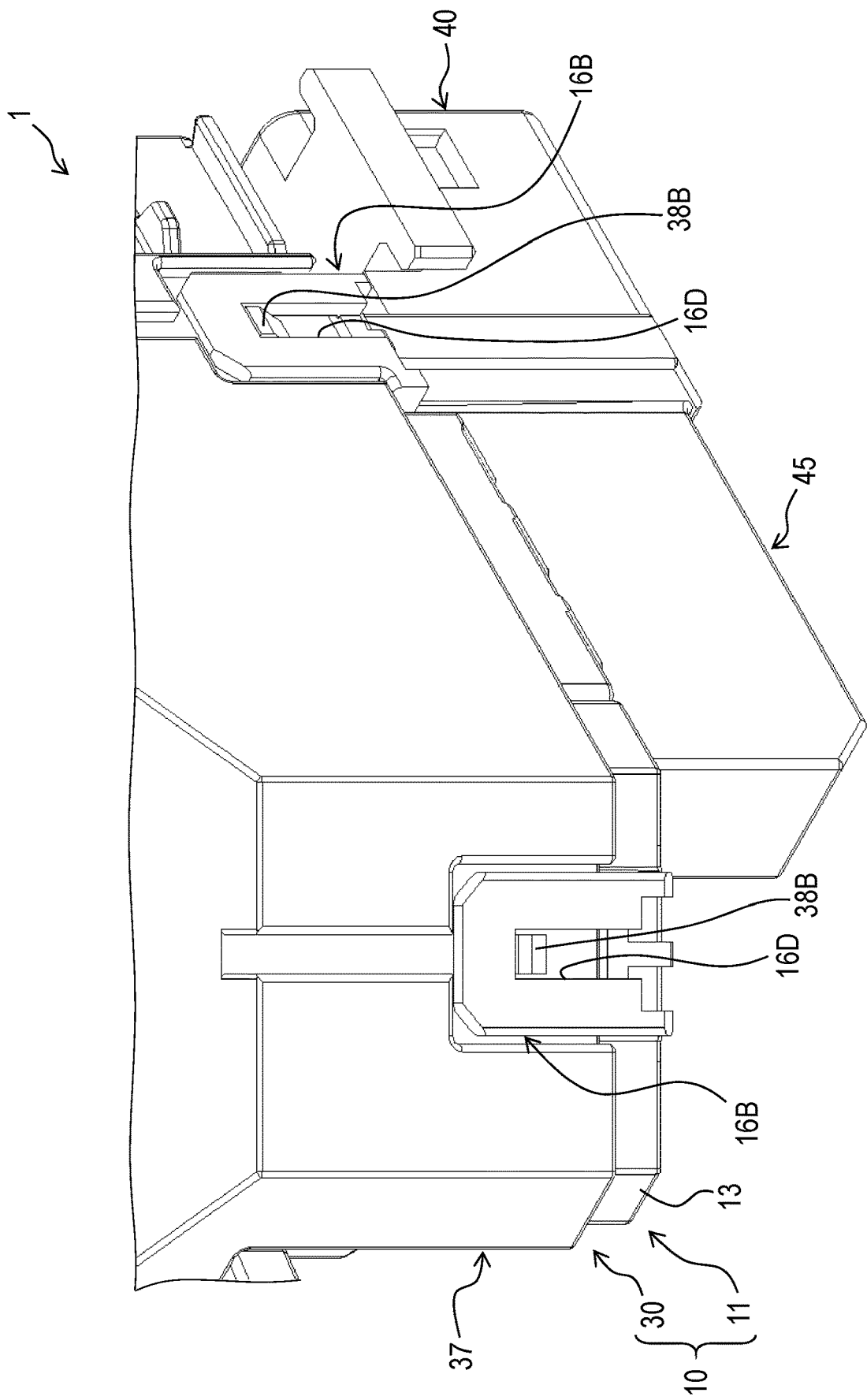
FIG. 9 is another partial perspective view of the rotary connector device illustrated in FIG. 1.

FIG. 9 is a partial perspective view of the rotary connector device 1. As illustrated in FIG. 9, the additional coupling body 16B includes the additional coupling groove 16D. The additional coupling groove 16D extends along the axial direction D1. However, the shape of the additional coupling body 16B is not limited to the present embodiment.

Figure 10:
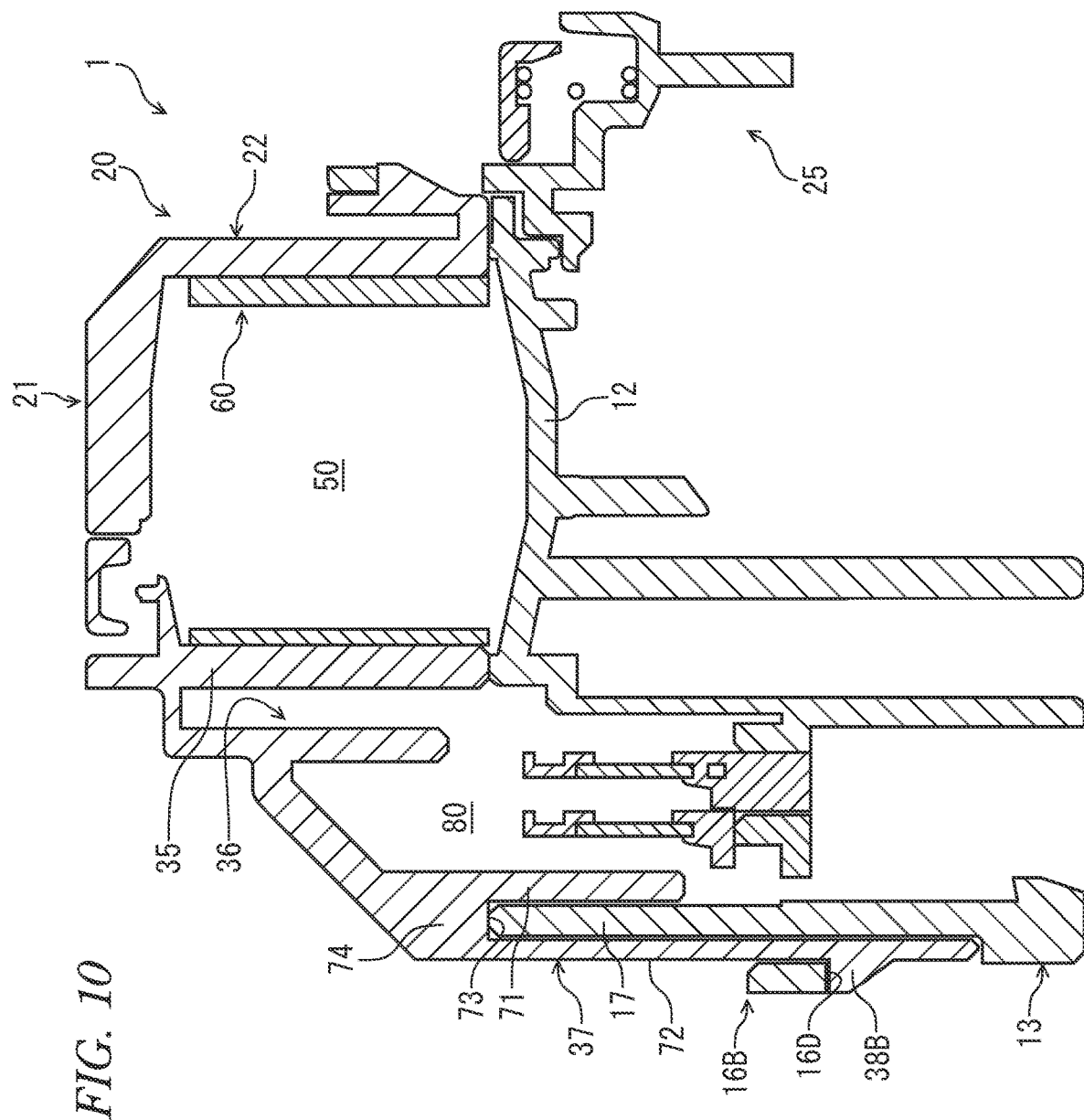
FIG. 10 is a cross-sectional view of the rotary connector device in line X-X in FIG. 4.

FIG. 10 is a cross-sectional view of the rotary connector device 1 in line X-X in FIG. 4. As illustrated in FIG. 10, the second stator main body 30 includes the additional protrusion 38B. The additional protrusion 38B protrudes from the cover portion 37 to the outer side in the radial direction D2. The additional coupling body 16B is contactable with the additional protrusion 38B so as to couple the second stator main body 30 to the first stator main body 11. In the present embodiment, the additional protrusion 38B is disposed in the additional coupling groove 16D in a state where the second stator main body 30 is coupled to the first stator main body 11.

As illustrated in FIG. 9, in the present embodiment, the second stator main body 30 includes a plurality of the additional protrusions 38B. However, the total number of the plurality of additional protrusions 38B is not limited to the present embodiment. At least one of the plurality of additional protrusions 38B may be omitted from the second stator main body 30.

Figure 11:
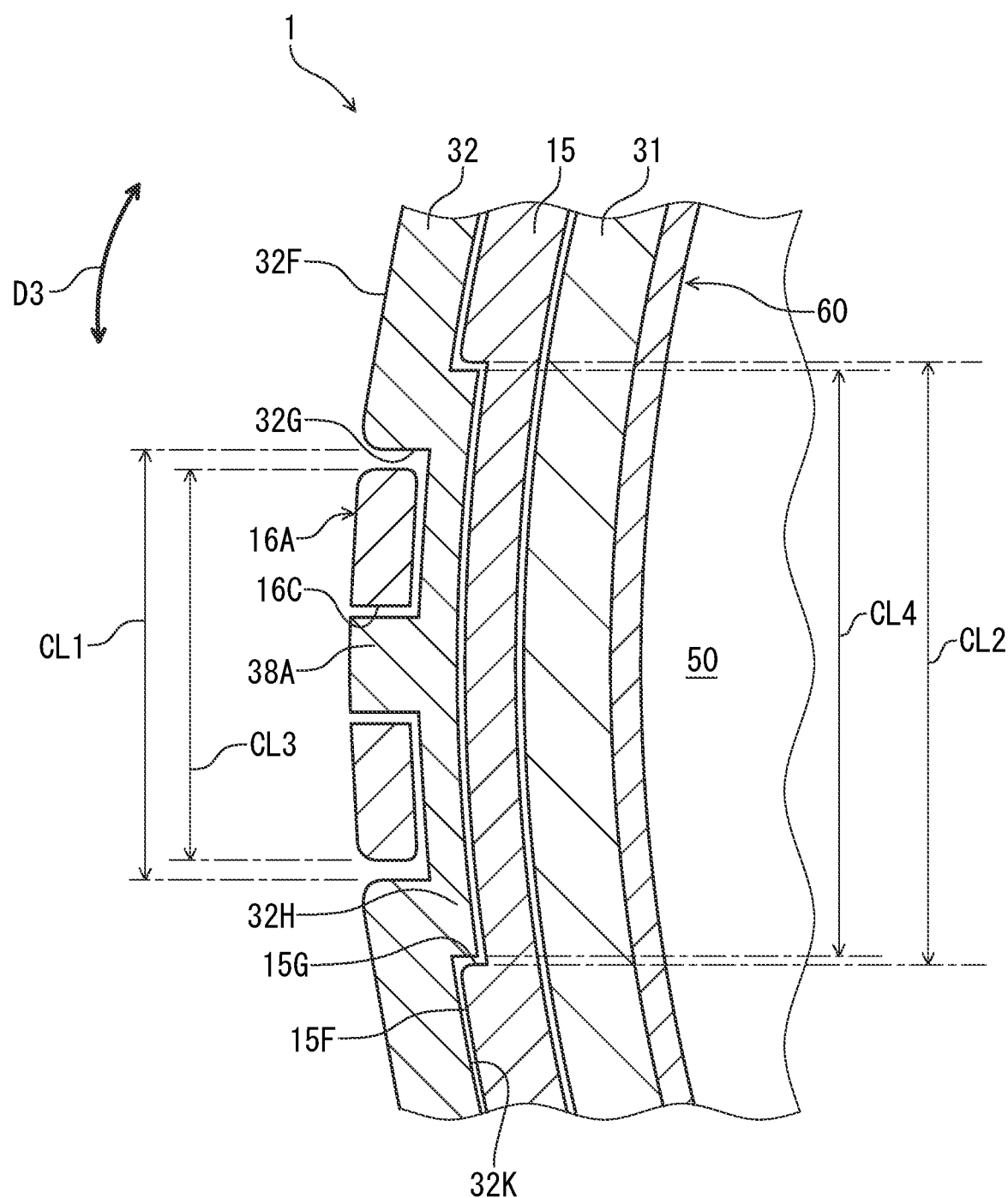
FIG. 11 is a partial cross-sectional view of the rotary connector device illustrated in FIG. 1.
Figure 12:
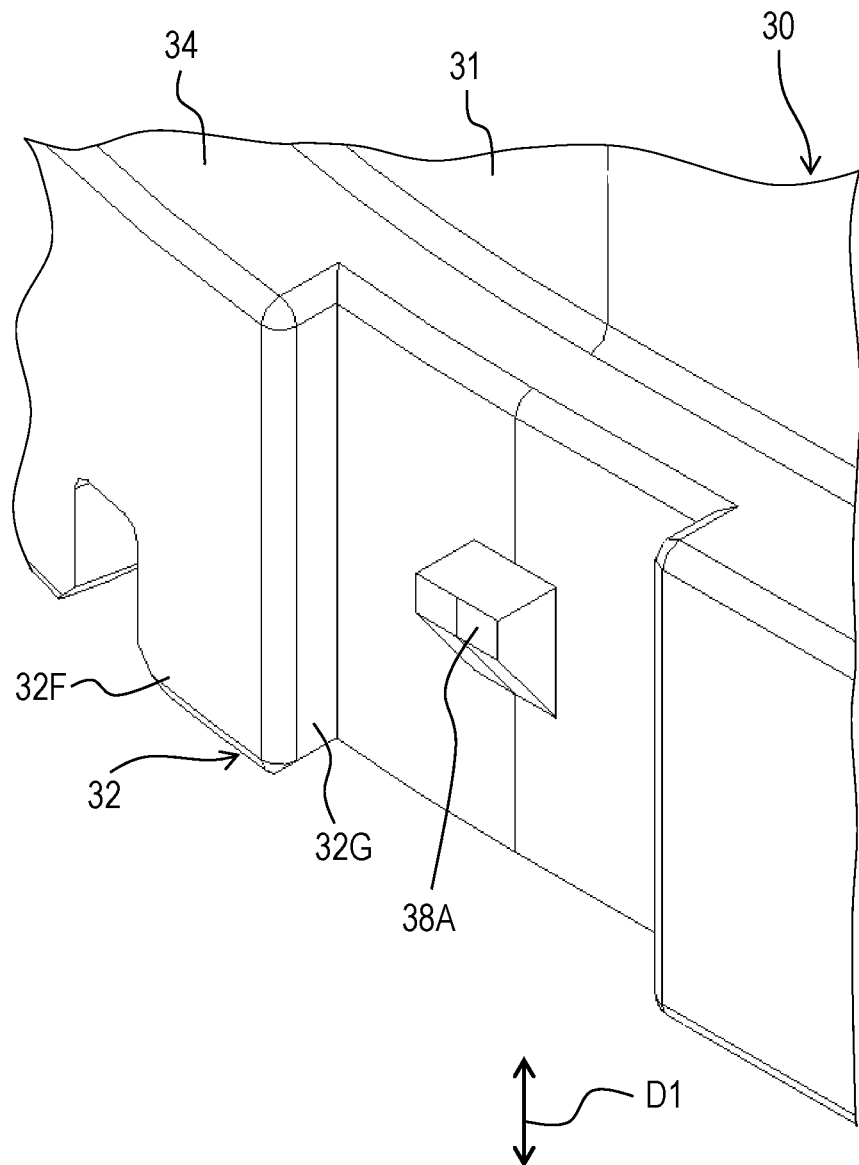
FIG. 12 is a partial perspective view of a second stator main body of the stator illustrated in FIG. 5.

FIG. 11 is a partial cross-sectional view of the rotary connector device 1. FIG. 12 is a partial perspective view of the second stator main body of the stator 10. As illustrated in FIG. 11, the second wall 32 includes an outer peripheral surface 32F and an outer recess 32G. The outer recess 32G is provided on the outer peripheral surface 32F. The coupling body 16A is disposed in the outer recess 32G. The protrusion 38A is disposed in the outer recess 32G. As illustrated in FIG. 12, the outer recess 32G extends along the axial direction D1.

As illustrated in FIG. 4, in the present embodiment, the second wall 32 includes a plurality of the outer recesses 32G. Each of the plurality of coupling bodies 16A is disposed in each of the plurality of outer recesses 32G, respectively. However, the total number of the plurality of outer recesses 32G is not limited to the present embodiment. At least one of the plurality of outer recesses 32G may be omitted from the second wall 32.

Figure 13:
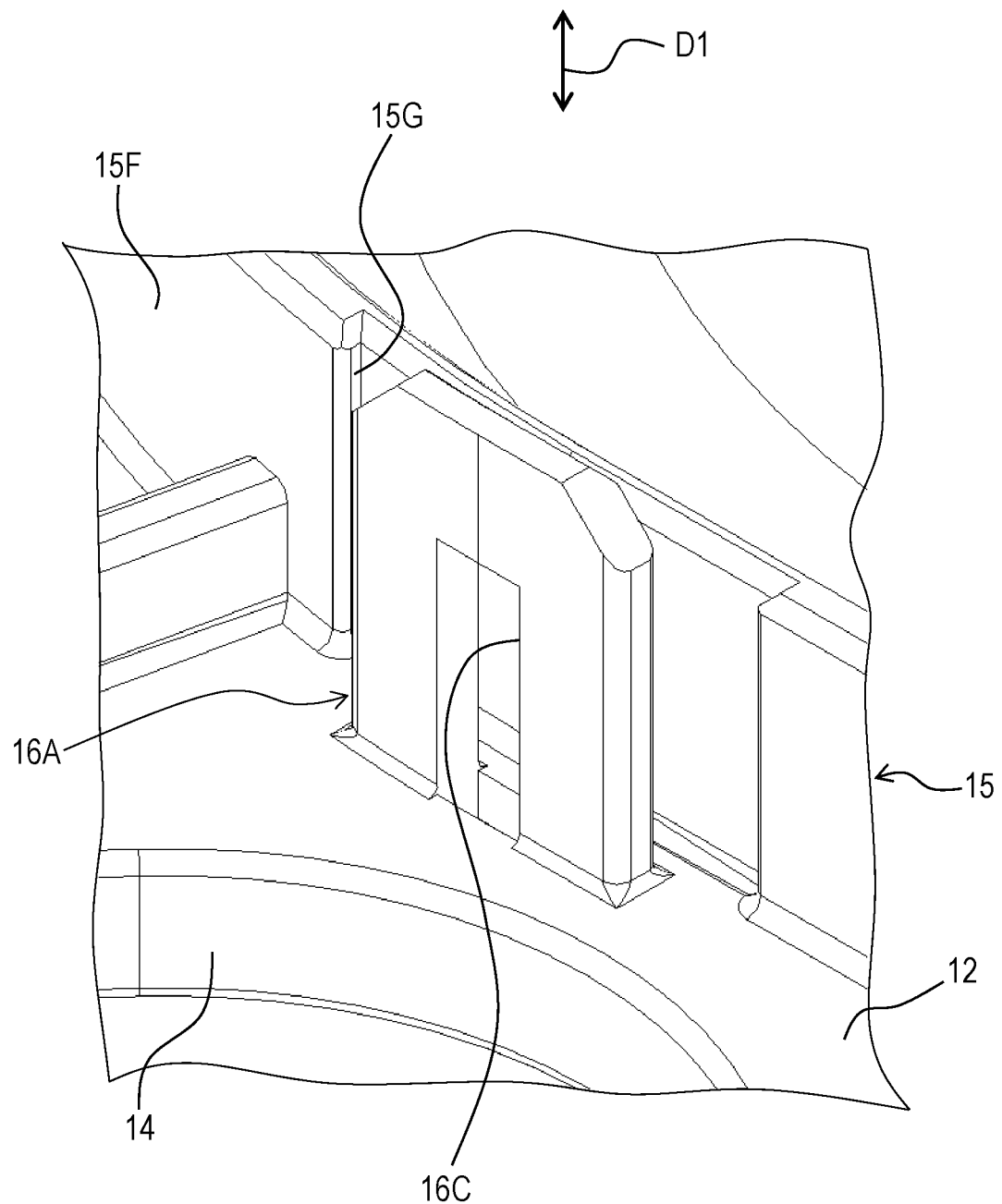
FIG. 13 is a partial perspective view of a first stator main body of the stator illustrated in FIG. 5.

FIG. 13 is a partial perspective view of the first stator main body 11 of the stator 10. As illustrated in FIG. 13, the intermediate wall 15 includes the intermediate outer peripheral surface 15F and the intermediate recess 15G. The intermediate recess 15G is provided on the intermediate outer peripheral surface 15F. The intermediate recess 15G extends from the base plate 12 along the axial direction D1.

As illustrated in FIG. 11, the second wall 32 includes the protruding portion 32H disposed in the intermediate recess 15G. The second wall 32 includes the inner peripheral surface 32K. The protruding portion 32H protrudes radially inwardly from the inner peripheral surface 32K. The inner peripheral surface 32K of the second wall 32 faces the intermediate outer peripheral surface 15F.

The intermediate recess 15G is disposed radially inwardly of the outer recess 32G. When viewed from the axial direction D1, the position of the intermediate recess 15G is substantially the same as the position of the outer recess 32G in the circumferential direction D3. The outer recess 32G has the first circumferential length CL1 defined in the circumferential direction D3. The intermediate recess 15G has the second circumferential length CL2 defined in the circumferential direction D3. The coupling body 16A has the third circumferential length CL3 defined in the circumferential direction D3. The protruding portion 32H has the fourth circumferential length CL4 defined in the circumferential direction D3. The second circumferential length CL2 is longer than the first circumferential length CL1, the third circumferential length CL3, and the fourth circumferential length CL4. The fourth circumferential length CL4 is longer than the first circumferential length CL1 and the third circumferential length CL3. The first circumferential length CL1 is longer than the third circumferential length CL3. The dimensional relationships between the first to fourth circumferential lengths CL1 to CL4 are not limited to the present embodiment. The positional relationship between the intermediate recess 15G and the outer recess 32G is not limited to the present embodiment.

As illustrated in FIG. 4, in the present embodiment, the intermediate wall 15 includes a plurality of the intermediate recesses 15G. The second wall 32 includes a plurality of the protruding portions 32H. Each of the plurality of protruding portions 32H is disposed in each of the plurality of intermediate recesses 15G, respectively. The total number of the plurality of intermediate recesses 15G is equal to the total number of the plurality of coupling bodies 16A. However, the total number of the plurality of intermediate recesses 15G and the plurality of protruding portions 32H is not limited to the present embodiment.

As illustrated in FIG. 8, the intermediate wall 15 has the thickness T22 defined in the radial direction D2. The thickness T22 is defined within the range of the intermediate recess 15G. The thickness T22 is less than the second maximum thickness T21 (FIG. 6). The second wall 32 has the thickness T32 defined in the radial direction D2. The thickness T32 is defined within the range of the outer recess 32G. The thickness T32 is less than the third maximum thickness T31 (FIG. 6). The thickness T32 is less than the thickness T22. However, the dimensional relationships of the thicknesses T22 and T32 are not limited to the present embodiment.

As illustrated in FIG. 10, the first stator main body 11 includes the intermediate wall 17. In the present embodiment, the connector housing section 13 includes the intermediate wall 17. The intermediate wall 17 extends along the axial direction D1. The second stator main body 30 includes the first wall 71 and the second wall 72. In the present embodiment, the cover portion 37 includes the first wall 71 and the second wall 72. The first wall 71 extends along the axial direction D1 and at least partially defines the connector housing space 80. The connector housing space 80 is connected to the cable passage 36. The second wall 72 extends along the axial direction D1 and is spaced apart from the first wall 71 in the radial direction D2. The second wall 72 is disposed radially outwardly of the first wall 71. The intermediate wall 17 is disposed between the first wall 71 and the second wall 72 in the radial direction D2.

The second stator main body 30 includes the intermediate groove 73 provided between the first wall 71 and the second wall 72 in the radial direction D2. The intermediate wall 17 is disposed in the intermediate groove 73. The second stator main body 30 includes the coupling portion 74 that couples the first wall 71 to the second wall 72. The intermediate groove 73 is defined by the first wall 71, the second wall 72, and the coupling portion 74. At least one of the first wall 71 and the second wall 72 is contactable with the intermediate wall 17 in the radial direction D2. In the present embodiment, the first wall 71 and the second wall 72 are contactable with the intermediate wall 17 in the radial direction D2. A bonding structure such as an adhesive layer may also be provided between the first wall 71 and the intermediate wall 17, and between the second wall 72 and the intermediate wall 17. The additional coupling body 16B is coupled to the intermediate wall 17. The additional protrusion 38B protrudes radially outwardly from the second wall 72.

The intermediate wall 17, the first wall 71, and the second wall 72 have substantially the same structure as the intermediate wall 15, the first wall 31, and the second wall 32. Thus, detailed descriptions of the intermediate wall 17, the first wall 71, and the second wall 72 are omitted.

The characteristics of the rotary connector device 1 are as follows.

(1) As illustrated in FIG. 6, in the rotary connector device 1, since the intermediate wall 15 of the first stator main body 11 is disposed between the first wall 31 and the second wall 32 in the radial direction D2, the path from the outer side of the stator 10 to the cable housing space 50 is longer. Thus, foreign matter is less likely to enter the cable housing space 50 from the outer side of the stator 10, and the environmental resistance of the rotary connector device 1 can be enhanced.

(2) As illustrated in FIG. 6, since the first wall 31 at least partially defines the cable housing space 50, the environmental resistance of the rotary connector device 1 can be enhanced while an increase in size of the rotary connector device 1 is suppressed.

(3) As illustrated in FIG. 6, since the first wall 31 and the second wall 32 are disposed on the outer side of the cable housing space 50 in the radial direction D2, the environmental resistance of the outer peripheral portion of the rotary connector device 1 that is easily exposed to the outside can be enhanced.

(4) As illustrated in FIG. 6, since the first maximum length L11 is greater than the first maximum thickness T11, the path from the outer side of the stator 10 to the cable housing space 50 can be further longer.

(5) As illustrated in FIG. 6, since the second maximum length L21 is greater than the second maximum thickness T21, the path from the outer side of the stator 10 to the cable housing space 50 can be further longer.

(6) As illustrated in FIG. 6, since the third maximum length L31 is greater than the third maximum thickness T31, the path from the outer side of the stator 10 to the cable housing space 50 can be further longer.

(7) As illustrated in FIG. 6, since the intermediate wall 15 is disposed in the intermediate groove 33, a labyrinth structure can be formed in the path from the outer side of the stator 10 to the cable housing space 50.

(8) As illustrated in FIG. 6, since the intermediate groove 33 is defined by the first wall 31, the second wall 32, and the coupling portion 34, the labyrinth structure can be reliably formed in the path from the outer side of the stator 10 to the cable housing space 50.

(9) As illustrated in FIG. 6, at least one of the first wall 31 and the second wall 32 is contactable with the intermediate wall 15 in the radial direction D2. Thus, the path from the outer side of the stator 10 to the cable housing space 50 can be narrowed, and the environmental resistance of the rotary connector device 1 can be further enhanced.

(10) As illustrated in FIG. 4, since at least one of the first wall 31, the second wall 32, and the intermediate wall 15 extends along the circumferential direction D3 defined about the rotational axis A1, a range in which the path from the outer side of the stator 10 to the cable housing space 50 is longer can be ensured widely in the circumferential direction D3. Thus, the environmental resistance of the rotary connector device 1 can be further enhanced.

(11) As illustrated in FIG. 4, since at least one of the first wall 31, the second wall 32, and the intermediate wall 15 extends over 90 degrees or greater in the circumferential direction D3, a range in which the path from the outer side of the stator 10 to the cable housing space 50 is longer can be reliably ensured widely in the circumferential direction D3.

(12) As illustrated in FIG. 4, since at least one of the first wall 31, the second wall 32, and the intermediate wall 15 extends over 180 degrees or greater in the circumferential direction D3, a range in which the path from the outer side of the stator 10 to the cable housing space 50 is longer can be further reliably ensured widely in the circumferential direction D3.

(13) As illustrated in FIG. 8, since the second wall 32 is disposed between the intermediate wall 15 and the coupling body 16A in the radial direction D2, the coupling strength of the coupling body 16A can be enhanced while the path from the outer side of the second wall 32 to the cable housing space 50 can be longer.

(14) As illustrated in FIG. 8, since the coupling body 16A is contactable with the protrusion 38A so as to couple the second stator main body 30 to the first stator main body 11, the coupling strength of the second stator main body 30 and the first stator main body 11 can be further enhanced.

(15) As illustrated in FIG. 11, since the coupling body 16A is disposed in the outer recess 32G, the coupling strength of the first stator main body 11 and the second stator main body 30 can be enhanced while an increase in size of the stator 10 can be suppressed.

(16) As illustrated in FIG. 11, since the intermediate recess 15G is disposed radially inwardly of the outer recess 32G, the path from the outer side of the stator 10 to the cable housing space 50 can be longer while an increase in size of the stator 10 can be suppressed.

(17) As illustrated in FIG. 11, since the second wall 32 includes the protruding portion 32H disposed in the intermediate recess 15G, the positioning of the first stator main body 11 and the second stator main body 30 in the circumferential direction D3 is facilitated.

(18) As illustrated in FIG. 6, since the intermediate wall 15 extends from the outer peripheral portion 12B of the base plate 12 along the axial direction D1, the path from the outer side of the stator 10 to the cable housing space 50 can be longer while the cable housing space 50 is ensured to be wide.

(19) As illustrated in FIG. 4, since at least a portion of the intermediate wall 15 is disposed above the rotational axis A1 when the stator is mounted on the vehicle body, even if, for example, the liquid is spilled into the rotary connector device 1 in a state where the stator 10 is mounted on the vehicle body, ingress of the liquid into the cable housing space 50 can be reliably suppressed by the intermediate wall 15.

(20) As illustrated in FIG. 6, since at least one of the first maximum length L11 and the second maximum length L21 is longer than the third maximum length L31, the length of the gap between at least one of the first wall 31 and the second wall 32 and the intermediate wall 15 can be ensured to be even longer.

(21) As illustrated in FIG. 6, since the fourth maximum length L41 is equal to or longer than the third maximum length L31, the length of the intermediate groove 33 can be ensured to be even longer.

Second Embodiment

Next, the rotary connector device 201 according to a second embodiment will be described with reference to FIG. 14 and FIG. 15. The rotary connector device 201 has the same structure as the rotary connector device 1 except for the first stator main body and the second stator main body. Thus, in this specification, for the sake of brevity, elements having substantially the same function as those described in the first embodiment are denoted by the same numerals and their descriptions are omitted.

Figure 14:
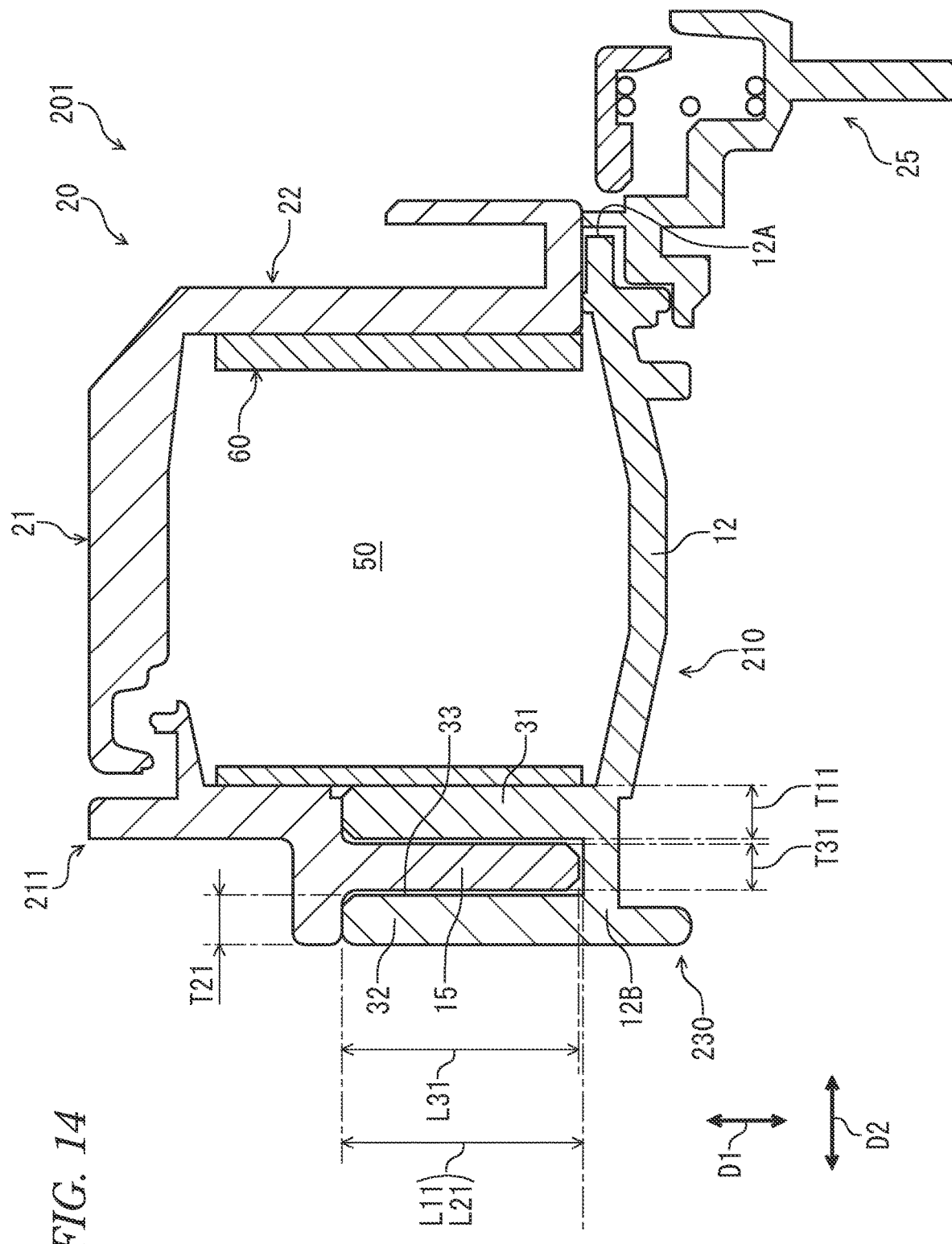
FIG. 14 is a partial cross-sectional view of a rotary connector device according to a second embodiment (corresponding to FIG. 6).

FIG. 14 is a partial cross-sectional view of the rotary connector device 201 according to the second embodiment and corresponds to FIG. 6 of the first embodiment. FIG. 15 is another partial cross-sectional view of the rotary connector device 201 and corresponds to FIG. 8 of the first embodiment.

Figure 15:
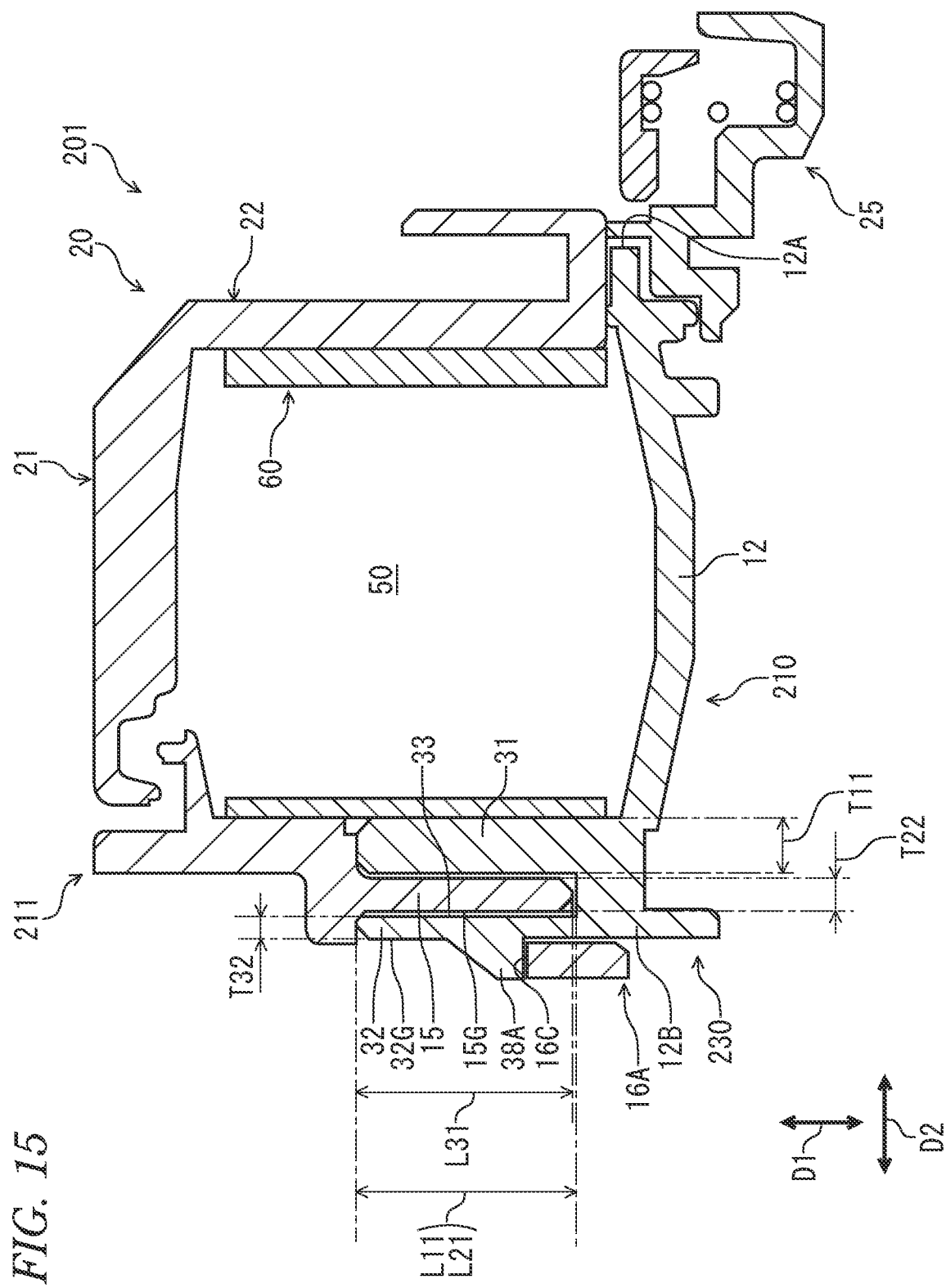
FIG. 15 is another partial cross-sectional view of the rotary connector device according to the second embodiment (corresponding to FIG. 8).

As illustrated in FIG. 14 and FIG. 15, the rotary connector device 201 includes the stator 210 and the rotation body 20. The stator 210 includes the first stator main body 211 and the second stator main body 230. The second stator main body 230 is a separate member from the first stator main body 211 and is coupled to the first stator main body 211. The stator 210 has substantially the same structure as the stator 10 of the first embodiment. In the present embodiment, the positional relationship between the first stator main body 211 and the second stator main body 230 interchanges the positional relationship of the first stator main body 11 and the second stator main body 30 of the first embodiment.

Specifically, the first stator main body 211 includes the intermediate wall 15. The second stator main body 230 includes the first wall 31 and the second wall 32. Unlike the first embodiment, in the present embodiment, the second stator main body 230 includes the base plate 12. The first wall 31 and the second wall 32 extend from the outer peripheral portion 12B of the base plate 12 along the axial direction D1.

In the present embodiment, the first wall 31 and the second wall 32 are integrally provided with the base plate 12 as one single member. However, at least one of the first wall 31 and the second wall 32 may be a separate member from the base plate 12.

In the rotary connector device 201, the same effect as that of the rotary connector device 1 of the first embodiment can be obtained.

It should be noted that, in the present application, "comprise" and its derivatives are non-limiting terms describing the presence of a component and do not exclude the presence of other components not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, each of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) A, B, and C. In the present disclosure, the expression "at least one of A and B" is not interpreted as "at least one of A and at least one of B."

Various alterations and modifications of the present disclosure are apparent from the foregoing disclosure. Accordingly, the present disclosure may be implemented in a manner different from the specific disclosure of the present application without departing from the spirit of the present disclosure.

What is claimed is:

1. A rotary connector device comprising:
    a stator including a first stator main body and a second stator main body that is a separate member from the first stator main body and is coupled to the first stator main body;
    a rotation body provided rotatably about a rotational axis with respect to the stator;
    the stator and the rotation body defining a cable housing space between the stator and the rotation body, the cable housing space being provided to surround the rotational axis;
    the second stator main body comprising:
        a first wall extending along an axial direction parallel to the rotational axis; and
        a second wall extending along the axial direction and spaced apart from the first wall in a radial direction perpendicular to the rotational axis;
    the first wall being disposed between the cable housing space and the second wall in the radial direction;
    the first stator main body including an intermediate wall extending along the axial direction, the intermediate wall being disposed between the first wall and the second wall in the radial direction; wherein
    the first stator main body includes
        a base plate at least partially defining the cable housing space, and
        a coupling body extending from the base plate along the axial direction and spaced apart from the intermediate wall in the radial direction, and
    the second wall is disposed between the intermediate wall and the coupling body in the radial direction.

2. The rotary connector device according to claim 1, wherein
    the first wall at least partially defines the cable housing space.

3. The rotary connector device according to claim 1, wherein
    the first wall and the second wall are disposed on an outer side of the cable housing space in the radial direction.

4. The rotary connector device according to claim 1, wherein
    the first wall has a first maximum thickness defined in the radial direction and a first maximum length defined in the axial direction, and
    the first maximum length is greater than the first maximum thickness.

5. The rotary connector device according to claim 1, wherein
    the second wall has a second maximum thickness defined in the radial direction and a second maximum length defined in the axial direction, and
    the second maximum length is greater than the second maximum thickness.

6. The rotary connector device according to claim 1, wherein
    the intermediate wall has a third maximum thickness defined in the radial direction and a third maximum length defined in the axial direction, and
    the third maximum length is greater than the third maximum thickness.

7. The rotary connector device according to claim 1, wherein
    the second stator main body includes an intermediate groove provided between the first wall and the second wall in the radial direction, and
    the intermediate wall is disposed in the intermediate groove.

8. The rotary connector device according to claim 7, wherein
    the second stator main body includes a coupling portion coupling the first wall to the second wall, and
    the intermediate groove is defined by the first wall, the second wall, and the coupling portion.

9. The rotary connector device according to claim 1, wherein
    at least one of the first wall and the second wall is contactable with the intermediate wall in the radial direction.

10. The rotary connector device according to claim 1, wherein
    at least one of the first wall, the second wall, and the intermediate wall extends in a circumferential direction defined about the rotational axis.

11. The rotary connector device according to claim 10, wherein
    at least one of the first wall, the second wall, and the intermediate wall extends over 90 degrees or greater in the circumferential direction.

12. The rotary connector device according to claim 11, wherein
    at least one of the first wall, the second wall, and the intermediate wall extends over 180 degrees or greater in the circumferential direction.

13. The rotary connector device according to claim 1, wherein
    the second stator main body includes a protrusion protruding radially outwardly from the second wall, and
    the coupling body is contactable with the protrusion to couple the second stator main body to the first stator main body.

14. The rotary connector device according to claim 1, wherein
    the second wall includes an outer peripheral surface and an outer recess provided on the outer peripheral surface, and
    the coupling body is disposed in the outer recess.

15. The rotary connector device according to claim 14, wherein
    the intermediate wall includes an intermediate outer peripheral surface and an intermediate recess provided on the intermediate outer peripheral surface, and
    the intermediate recess is disposed radially inwardly of the outer recess.

16. The rotary connector device according to claim 15, wherein
    the second wall includes a protrusion disposed in the intermediate recess.

17. The rotary connector device according to claim 1, wherein
    the intermediate wall includes an intermediate outer peripheral surface and an intermediate recess provided on the intermediate outer peripheral surface, and
    the second wall includes a protrusion disposed in the intermediate recess.

18. The rotary connector device according to claim 1, wherein
    the base plate includes an outer peripheral portion, and
    the intermediate wall extends from the outer peripheral portion of the base plate along the axial direction.

19. The rotary connector device according to claim 1, wherein
　at least a portion of the intermediate wall is disposed above the rotational axis when the stator is mounted on a vehicle body.

20. The rotary connector device according to claim 1, wherein
　the first wall has a first maximum length defined in the axial direction,
　the second wall has a second maximum length defined in the axial direction,
　the intermediate wall has a third maximum length defined in the axial direction, and
　at least one of the first maximum length and the second maximum length is longer than the third maximum length.

21. The rotary connector device according to claim 1, wherein
　the second stator main body includes an intermediate groove provided between the first wall and the second wall in the radial direction,
　the intermediate wall has a third maximum length defined in the axial direction,
　the intermediate groove has a fourth maximum length defined in the axial direction, and
　the fourth maximum length is equal to or longer than the third maximum length.

* * * * *